United States Patent
Ono et al.

(10) Patent No.: US 10,968,287 B2
(45) Date of Patent: Apr. 6, 2021

(54) METHOD FOR PRODUCING HYDROGENATED CONJUGATED DIENE POLYMER LATEX

(71) Applicant: ZEON CORPORATION, Tokyo (JP)

(72) Inventors: Kentaro Ono, Tokyo (JP); Chikara Katano, Tokyo (JP); Yasuaki Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 136 days.

(21) Appl. No.: 16/476,403

(22) PCT Filed: Jan. 18, 2018

(86) PCT No.: PCT/JP2018/001448
§ 371 (c)(1),
(2) Date: Jul. 8, 2019

(87) PCT Pub. No.: WO2018/135596
PCT Pub. Date: Jul. 26, 2018

(65) Prior Publication Data
US 2020/0048375 A1    Feb. 13, 2020

(51) Int. Cl.
C08C 19/02    (2006.01)
(52) U.S. Cl.
CPC .................................. C08C 19/02 (2013.01)
(58) Field of Classification Search
CPC .. C08C 19/02; B04B 1/20; B04B 1/00; B04B 3/00; B01D 21/262
See application file for complete search history.

(56) References Cited

U.S. PATENT DOCUMENTS

| | | | | |
|---|---|---|---|---|
| 2,845,406 A | * | 7/1958 | Cines | C08C 2/04 |
| | | | | 528/497 |
| 4,254,287 A | * | 3/1981 | Ziegenhain | C07C 41/36 |
| | | | | 568/621 |
| 4,647,627 A | * | 3/1987 | Buding | C08C 19/02 |
| | | | | 525/192 |
| 5,073,621 A | * | 12/1991 | Tsiang | C08F 8/04 |
| | | | | 528/483 |
| 5,272,202 A | | 12/1993 | Kubo et al. | |

FOREIGN PATENT DOCUMENTS

| | | | | |
|---|---|---|---|---|
| CN | 101333264 | * | 12/2008 | |
| JP | H02-178305 A | | 7/1990 | |
| JP | 2004-043600 A | | 2/2004 | |
| WO | WO-03085008 A1 | * | 10/2003 | ............... C08C 1/04 |

OTHER PUBLICATIONS

Translation of WO-03085008 (Year: 2003).*
Translation of CN 101333264 (Year: 2008).*
Apr. 3, 2018 Search Report issued in International Application No. PCT/JP2018/001448.

* cited by examiner

Primary Examiner — Robert C Boyle
(74) Attorney, Agent, or Firm — Oliff PLC (57) ABSTRACT

A method for producing a hydrogenated conjugated diene polymer latex includes: a hydrogenation step of dissolving or dispersing a hydrogenation catalyst containing a platinum group element in a latex of a conjugated diene polymer to hydrogenate a carbon-carbon unsaturated bond in the polymer; an insoluble complex formation step of complexing the platinum group element with a complexing agent to form an insoluble complex; and an insoluble complex removing step of continuously feeding the latex which has undergone the insoluble complex formation step to a centrifuge machine and continuously performing a centrifugation operation to continuously remove the insoluble complex from the latex and continuously discharge the insoluble complex out of the centrifuge machine. In the insoluble complex removal step the feed rate of the latex to the centrifuge machine is adjusted to 0.5 to 15 $m^3$/hour, and the centrifugal force in the centrifugation operation is adjusted to 200 to 10,000 G.

5 Claims, 1 Drawing Sheet

METHOD FOR PRODUCING HYDROGENATED CONJUGATED DIENE POLYMER LATEX

TECHNICAL FIELD

The present invention relates to a method for producing a hydrogenated conjugated diene polymer latex, and more particularly relates to a method for producing a hydrogenated conjugated diene polymer latex where a hydrogenation catalyst can be removed and recovered with excellent operability and at a high removal and recovery efficiency.

BACKGROUND ART

In the chemical industry for producing medicines and agrochemicals, petrochemical products, polymers and the like, a hydrogenation reaction is widely performed for hydrogenating carbon-carbon unsaturated bonds or carbon-nitrogen unsaturated bonds included in various compounds, and converting the bonds to corresponding saturated bonds.

For example, in the field of polymer production, as a useful reforming means for a conjugated diene polymer, a method for hydrogenating selectively or partially a carbon-carbon double bond of a conjugated diene polymer is known, and a hydrogenated conjugated diene polymer such as a hydrogenated acrylonitrile-butadiene copolymer is produced on an industrial scale.

As a typical processes for producing such a hydrogenated conjugated diene polymer, a process including (1) a step of performing an emulsion polymerization of a monomer containing a conjugated diene and coagulating and drying the obtained latex to prepare a source polymer; (2) a step of dissolving the source polymer in an organic solvent and hydrogenating the same using a supported (heterogeneous) catalyst where a hydrogenation catalyst is supported on a carrier insoluble in the organic solvent; and (3) a step of separating the supported catalyst from the hydrogenation reaction mixture, and recovering the target hydrogenated polymer out of the organic solvent; has been known.

However, the above process requires further an operation of dissolving again the source polymer which is once recovered from the latex of the conjugated diene polymer into an organic solvent, and distilling away the organic solvent which is used for the hydrogenation reaction after the reaction. Therefore, from the viewpoint of improving the productivity, development of a process of hydrogenating a conjugated diene polymer in a latex state is strongly demanded, and various studies have been made (see, for example, Patent Document 1).

In the method of hydrogenating a conjugated diene polymer in a latex state, there has been a drawback in that, although the contact efficiency between a polymer in a latex and a hydrogenation catalyst is improved by using an unsupported catalyst which can be dissolved or dispersed in an aqueous medium so that the hydrogenation activity is enhanced, separation of the catalyst after completion of the reaction is extremely difficult, and recovery and reuse of the catalyst are not possible, which increases therefore the catalyst cost remarkably.

Meanwhile, Patent Document 2 proposes a method of causing a complexing agent to act on a hydrogenation catalyst containing a platinum group element to form an insoluble complex and removing the hydrogenation catalyst in a state of the insoluble complex. According to the technique of Patent Document 2, it becomes possible to remove and recover the hydrogenation catalyst to some extent by making the hydrogenation catalyst in the complex state, however the removal and recovery efficiency is not necessarily sufficient, and improvement of the removal and recovery efficiency has been desired. In addition, in a method for removing a hydrogenation catalyst in a form of an insoluble complex, clogging of a filter, etc. used for removal tends to occur, and therefore repair services used to be relatively frequently necessary. Consequently, it has been desired to improve the operability by decreasing the frequency of such repair services.

RELATED ART

Patent Documents

Patent Document 1: Japanese Patent Laid-Open No. H2-178305
Patent Document 2: Japanese Patent Laid-Open No. 2004-43600

SUMMARY OF THE INVENTION

Problem to be Solved by the Invention

The present invention has been made in view of above circumstances with an object to provide a method for producing a hydrogenated conjugated diene polymer latex where a hydrogenation catalyst can be removed and recovered with excellent operability and at a high removal and recovery efficiency.

Means for Solving the Problem

The present inventors studied diligently for achieving the above object to find that a hydrogenation catalyst can be removed and recovered with excellent operability and at a high removal and recovery efficiency in a method for hydrogenating a carbon-carbon unsaturated bond in a polymer by dissolving or dispersing a hydrogenation catalyst containing a platinum group element in a latex of a conjugated diene polymer by complexing the platinum group element with a complexing agent to form an insoluble complex, continuously feeding the latex containing such an insoluble complex to a centrifuge machine at a predetermined feed rate, and continuously performing a centrifugation operation under a predetermined condition to continuously remove the insoluble complex and continuously discharge the thus separated and removed insoluble complex out of the centrifuge machine, and thereby completing the present invention.

That is, the present invention provides a method for producing a hydrogenated conjugated diene polymer latex comprising:

a hydrogenation step of dissolving or dispersing a hydrogenation catalyst containing a platinum group element in a latex of a conjugated diene polymer to hydrogenate a carbon-carbon unsaturated bond in the conjugated diene polymer;

an insoluble complex formation step of complexing the platinum group element with a complexing agent to form an insoluble complex; and an insoluble complex removing step of continuously feeding the latex which has undergone the insoluble complex formation step to a centrifuge machine and continuously performing a centrifugation operation to continuously remove the insoluble complex from the latex and continuously discharge the insoluble complex out of the centrifuge machine;

wherein in the insoluble complex removal step the feed rate of the latex to the centrifuge machine is adjusted to 0.5 to 15 m³/hour, and the centrifugal force in the centrifugation operation is adjusted to 200 to 10,000 G.

In the production method of the present invention, the centrifuge machine is preferably a decanter-type centrifuge machine.

In the insoluble complex formation step in the production method of the present invention, an oxidation treatment is preferably performed on the latex to oxidize the hydrogenation catalyst in a reduced state present in the latex.

In the production method of the present invention, the complexing agent is preferably a dioxime compound.

In the production method of the present invention, the conjugated diene polymer is preferably a copolymer including a conjugated diene monomer unit and an α,β-ethylenically unsaturated nitrile monomer unit.

Effects of Invention

The present invention can provide a method for producing a hydrogenated conjugated diene polymer latex, wherein a hydrogenation catalyst can be removed and recovered with excellent operability and at a high removal and recovery efficiency.

DESCRIPTION OF EMBODIMENTS

The method of the present invention for producing a hydrogenated conjugated diene polymer latex comprises:

a hydrogenation step of dissolving or dispersing a hydrogenation catalyst containing a platinum group element in a latex of a conjugated diene polymer to hydrogenate a carbon-carbon unsaturated bond in the polymer;

an insoluble complex formation step of complexing the platinum group element with a complexing agent to form an insoluble complex; and an insoluble complex removing step of continuously feeding the latex which has undergone the insoluble complex formation step to a centrifuge machine and continuously performing a centrifugation operation to continuously remove the insoluble complex from the latex and continuously discharge the insoluble complex out of the centrifuge machine;

wherein in the insoluble complex removal step the feed rate of the latex to the centrifuge machine is adjusted to 0.5 to 15 m³/hour, and the centrifugal force in the centrifugation operation is adjusted to 200 to 10,000 G.

Latex of Conjugated Diene Polymer

The latex of a conjugated diene polymer used in the production method of the present invention is generally obtained by emulsion polymerization of a conjugated diene monomer, and a monomer copolymerizable with a conjugated diene monomer to be used as required. As a latex of a conjugated diene polymer, one to be yielded by a phase inversion method subsequent to solution polymerization may be used.

A conjugated diene monomer is not particularly limited, insofar as it is a polymerizable monomer having a conjugated diene structure, and examples thereof include 1,3-butadiene, 2-methyl-1,3-butadiene (isoprene), 2,3-dimethyl-1,3-butadiene, 2-chloro-1,3-butadiene, 1,3-pentadiene, and the like. Among these, 1,3-butadiene and 2-methyl-1,3-butadiene are preferable, and 1,3-butadiene is more preferable.

Examples of a monomer copolymerizable with a conjugated diene monomer include an α,β-ethylenically unsaturated nitrile monomer, such as acrylonitrile, methacrylonitrile, and crotononitrile; an α,β-ethylenically unsaturated carboxylic acid, such as acrylic acid, methacrylic acid, crotonic acid, fumaric acid, maleic acid, and itaconic acid, and anhydrides thereof; an α,β-ethylenically unsaturated carboxylic acid ester, such as methyl acrylate, n-butyl acrylate, 2-ethylhexyl acrylate, trifluoroethyl acrylate, methyl methacrylate, and methyl crotonate; an α,β-ethylenically unsaturated dicarboxylic acid monoester monomer, such as mono-n-butyl maleate, mono-n-butyl itaconate, mono-n-butyl fumarate, and mono-cyclohexyl fumarate; an alkoxyalkyl (meth)acrylic acid ester monomer, such as methoxymethyl (meth)acrylate, methoxyethyl (meth)acrylate, ethoxymethyl (meth)acrylate, and ethoxyethyl (meth)acrylate; an α,β-ethylenically unsaturated polyvalent carboxylic acid monomer; an α,β-ethylenically unsaturated carboxylic acid amide, such as acrylamide, and methacrylamide; a vinyl aromatic compound, such as styrene, α-methylstyrene, p-methylstyrene, and divinylbenzene; a vinyl ester, such as vinyl acetate, and vinyl propionate; and a vinyl ether compound, such as fluoroethyl vinyl ether.

Specific examples of a conjugated diene polymer composing a latex of a conjugated diene polymer used in the production method of the present invention include a butadiene polymer, an isoprene polymer, a butadiene/styrene copolymer, an acrylonitrile/butadiene copolymer, an acrylonitrile/isoprene copolymer, an acrylonitrile/butadiene/isoprene copolymer, a methacrylonitrile/butadiene copolymer, a methacrylonitrile/isoprene copolymer, a methacrylonitrile/butadiene/isoprene copolymer, an acrylonitrile/methacrylonitrile/butadiene copolymer, an acrylonitrile/butadiene/methyl acrylate copolymer, an acrylonitrile/butadiene/acrylic acid copolymer, an acrylonitrile/butadiene/methacrylic acid copolymer, an acrylonitrile/butadiene/n-butyl acrylate copolymer, an acrylonitrile/butadiene/n-butyl acrylate/mono-n-butyl itaconate copolymer, an acrylonitrile/butadiene/mono-n-butyl maleate copolymer, an acrylonitrile/butadiene/n-butyl acrylate/mono-n-butyl maleate copolymer, an acrylonitrile/butadiene/2-methoxyethyl acrylate/mono-n-butyl maleate copolymer, acrylonitrile/butadiene/2-methoxyethyl acrylate copolymer, acrylonitrile/butadiene/mono-n-butyl itaconate copolymer, acrylonitrile/butadiene/mono-n-butyl fumarate copolymer, an acrylonitrile/butadiene/2-methoxyethyl acrylate/mono-n-butyl itaconate copolymer, and the like. The conjugated diene polymer may be a copolymer including a conjugated diene monomer unit and an α,β-ethylenically unsaturated nitrile monomer unit.

The composition ratio of the monomer units constituting a conjugated diene polymer is not particularly limited but 5 to 100% by weight of the conjugated diene monomer unit and 95 to 0% by weight of a monomer copolymerizable with the conjugated diene is preferable, 10 to 90% by weight of the conjugated diene monomer unit and 90 to 10% by weight of a monomer copolymerizable with the conjugated diene is more preferable. Further, the weight average molecular weight (gel permeation chromatography method, in terms of standard polystyrene) of a conjugated diene polymer is not particularly limited but ordinarily 5,000 to 2,000,000.

An emulsion polymerization method as a preferred method for preparing a conjugated diene polymer is to carry out polymerization generally in an aqueous medium using a radical polymerization initiator. In the emulsion polymerization method, as a polymerization initiator, or a molecular weight modifier, a publicly known one may be used. The polymerization reaction may be any of batch, semi-batch or continuous method, and the polymerization temperature or pressure are not particularly limited. The emulsifier to be used is also not particularly limited, and an anionic surfactant, a cationic surfactant, an amphoteric surfactant, a nonionic surfactant and the like may be used, but an anionic surfactant is preferable. These emulsifiers may be used singly, or in combination of two or more kinds thereof. The amount used is not particularly limited.

The solid content concentration of a latex of the conjugated diene polymer obtained by emulsion polymerization is not particularly limited but ordinarily 2 to 50% by weight, preferably 5 to 45% by weight. The solid content concentration may be appropriately adjusted by a known method, such as a blending method, a dilution method, and a concentration method.

Hydrogenation Step

The hydrogenation step in a production method of the present invention is a step of dissolving or dispersing a hydrogenation catalyst containing a platinum group element in the latex of a conjugated diene polymer to hydrogenate a carbon-carbon unsaturated bond in the polymer.

As the hydrogenation catalyst containing a platinum group element used in the hydrogenation step, any water-soluble or water-dispersible platinum group element compound may be used, and specific examples thereof include a ruthenium compound, a rhodium compound, a palladium compound, an osmium compound, an iridium compound, a platinum compound and the like. In the production method of the present invention, such a hydrogenation catalyst is used for a hydrogenation reaction in a dissolved or dispersed state in the latex of a conjugated diene polymer without being supported on a carrier. As a hydrogenation catalyst, a palladium compound, or a rhodium compound is preferable, and a palladium compound is particularly preferable. Further, two or more platinum group elements may be used in combination, however also in such a case it is preferable to use a palladium compound as a main catalyst component.

A palladium compound is not particularly limited, insofar as it is water-soluble or water-dispersible, and exhibits catalytic activity for hydrogenation, and a water-soluble one is preferable. As a palladium compound, a divalent or tetravalent palladium compound is ordinarily used, and examples of the form thereof include a salt, and a complex salt.

Examples of a palladium compound include an organic acid salt, such as palladium acetate, palladium formate, and palladium propionate; an inorganic acid salt, such as palladium nitrate, and palladium sulfate; a halide, such as palladium fluoride, palladium chloride, palladium bromide, and palladium iodide; an inorganic palladium compound, such as palladium oxide, and palladium hydroxide; an organic palladium compound, such as dichloro(cyclooctadiene) palladium, dichloro(norbornadiene) palladium, and dichlorobis (triphenylphosphine)palladium; a halide salt, such as sodium tetrachloropalladate, and ammonium hexachloropalladate; a complex salt, such as potassium tetracyanopalladate; and the like. Among these palladium compounds, an organic acid salt, or an inorganic acid salt, such as palladium acetate, palladium nitrate, and palladium sulfate; palladium chloride; a halide salt, such as sodium tetrachloropalladate, and ammonium hexachloropalladate; are preferable, and palladium acetate, palladium nitrate, and palladium chloride are more preferable.

Examples of a rhodium compound include a halide, such as rhodium chloride, rhodium bromide, and rhodium iodide; an inorganic acid salt, such as rhodium nitrate, and rhodium sulfate; an organic acid salt, such as rhodium acetate, rhodium formate, rhodium propionate, rhodium butyrate, rhodium valerate, rhodium naphthenate, and rhodium acetylacetonate; rhodium oxide; rhodium trihydroxide; and the like.

As the platinum group element compound, a commercially available one may be used, or one prepared by a publicly known method may be used. A method for dissolving or dispersing a platinum group element compound in the latex of a conjugated diene polymer is not particularly limited, and examples thereof include a method of directly adding a platinum group element compound to the latex, a method of adding a platinum group element compound in the state of being dissolved or dispersed in water into the latex, and the like. When dissolving or dispersing the same in water, it may be preferable in some cases, if coexisting an inorganic acid, such as nitric acid, sulfuric acid, hydrochloric acid, bromic acid, perchloric acid, and phosphoric acid; a sodium salt, a potassium salt of the inorganic acid; an organic acid such as acetic acid; and the like, because the solubility of the platinum group element compound in water is increased.

In the production method of the present invention, by using the platinum group element compound dissolved or dispersed in the latex of a conjugated diene polymer, a hydrogenation reaction can be efficiently advanced in the latex state. In this regard, in the hydrogenation reaction, the pH of a hydrogenation reaction solution (conjugated diene polymer latex) measured by a pH meter is not particularly limited, insofar as the pH is 12 or less, and preferably in the range of 2.0 to 11.0, more preferably 3.0 to 10.5, and further preferably 4.0 to 10.0.

The pH of a hydrogenation reaction solution (latex of conjugated diene polymer) can be adjusted by using a basic compound, an acidic compound, and the like. The basic compound is not particularly limited, and examples thereof include an alkali metal compound, an alkaline earth metal compound, ammonia, an ammonium salt compound, an organic amine compound, and the like. Among these, an alkali metal compound, and an alkaline earth metal compound are preferable. The acidic compound is not particularly limited, and examples thereof include sulfuric acid, nitric acid, and the like.

As the alkali metal compound, a hydroxide, such as lithium hydroxide, sodium hydroxide, and potassium hydroxide; a carbonate compound, such as lithium carbonate, sodium carbonate, and potassium carbonate; and a hydrogencarbonate compound, such as lithium hydrogencarbonate, sodium hydrogencarbonate, and potassium hydrogencarbonate; may be favorably used, and among these a hydroxide is more preferable.

As the alkaline earth metal compound, a hydroxide, a carbonate compound, or a hydrogencarbonate compound of an alkaline earth metal, such as magnesium, calcium, strontium, and barium, may be favorably used, and among these a hydroxide is more preferable.

Examples of the ammonium salt compound include ammonium carbonate, ammonium hydrogencarbonate, and the like.

Examples of the organic amine compound include triethylamine, ethanolamine, morpholine, N-methylmorpholine, pyridine, hexamethylenediamine, dodecamethylenediamine, xylylenediamine, and the like.

These basic compounds and acidic compounds may be used as they are, or may be used after dilution or dissolution with water or an organic solvent such as an alcohol. The basic compounds or the acidic compounds may be used singly or in combination of two or more kinds thereof, and the amount thereof used may be appropriately selected such that the hydrogenation reaction solution exhibits a predetermined pH. There is also no particular restriction on the method and timing of addition of a basic compound, or an acidic compound to a hydrogenation reaction solution, and there are, for example, a method where a basic compound or an acidic compound is added in advance into the latex before a hydrogenation catalyst is added to a hydrogenation reaction solution, and a method where a basic compound or an acidic compound is added after the initiation of a hydrogenation reaction.

Further, a catalyst stabilizer may be used for the purpose of maintaining the stability of a platinum group element compound in the latex. Specific examples of the catalyst stabilizer include polyvinylpyrrolidone, polyvinyl alcohol, polyvinyl acetal, sodium polyacrylate, sodium polyphosphate, gelatin, albumin, protalbic acid, and lysalbic acid. Among these, polyvinylpyrrolidone, polyvinyl alcohol, and sodium polyacrylate are preferable.

The temperature of a hydrogenation reaction is ordinarily 0 to 200° C., preferably 5 to 150° C., and more preferably 10 to 100° C. The pressure of hydrogen is ordinarily 0.1 to 20 MPa, preferably 0.1 to 15 MPa, and more preferably 0.1 to 10 MPa. The reaction time is not particularly restricted, but it is ordinarily 30 min to 50 hours.

In the hydrogenation step of the production method of the present invention, a hydrogenation reaction can be rapidly progressed in spite of the reaction in the latex state. The hydrogenation ratio of the hydrogenated conjugated diene polymer to be obtained (the ratio of hydrogenated carbon-carbon double bonds to the total carbon-carbon double bonds present in the polymer before the reaction) may be regulated at will in the range of 1 to 100% by controlling appropriately the above-described various reaction conditions. The hydrogenation ratio represented by iodine values is preferably 120 or less.

Insoluble Complex Formation Step

The insoluble complex formation step of the production method of the present invention is a step of forming an insoluble complex by causing a platinum group element in a platinum group element compound present in an aqueous medium or in polymer particles in the latex of a conjugated diene polymer after completion of the hydrogenation reaction to form a complex with a complexing agent. The insoluble complex is formed as a precipitate in the latex.

The method for adding a complexing agent is not particularly limited, but it is preferable that the same is added in a state of powder, solution, dispersion, etc. to a latex of a conjugated diene polymer after completion of a hydrogenation reaction, and next the complexing agent and the platinum group element compound are brought into contact with each other by stirring, mixing, etc. to form a complex. Then the thus formed insoluble complex is preferably made to grow or aggregate to have a particle size larger than the polymer particles contained in the latex from the viewpoint of properly removing and recovering the complex at the time of removal and recovery of the same from the latex in an insoluble complex removal step described below. Specifically, it is preferable that the latex with the complexing agent is stirred as above in a heated state, subsequently left to stand still keeping the heated state, and then cooled down.

A complexing agent is not particularly limited, insofar as it exhibits a complexing action on a platinum group element, and forms a complex which is insoluble in water together with a platinum group element, one capable of forming a strongly cohesive insoluble complex is preferable. Examples of a complexing agent include an oxime compound, a dioxime compound is preferable from the viewpoint of high complex forming ability, and an $\alpha,\beta$-alkanedione dioxime, such as dimethylglyoxime, and cyclohexanedione dioxime, is more preferable. Among these, dimethylglyoxime is particularly preferable. The amount of the complexing agent used is usually 0.5 to 50 molar equivalents with respect to a platinum group element contained in a platinum group element compound used as the hydrogenation catalyst, and preferably 1.0 to 30 molar equivalents.

In the production method of the present invention, it is preferable to perform an oxidation treatment for oxidizing a catalyst in the reduced state present in a latex with respect to a latex having undergone a hydrogenation reaction, before a complexing agent is added, or when a complexing agent is added and mixed. The oxidation treatment may be ordinarily carried out by using an oxidizing agent and bringing the oxidizing agent into contact with the catalyst in the reduced state present in the latex. By carrying out the oxidation treatment, an insoluble complex can be more easily formed in the insoluble complex formation step.

The oxidizing agent is not particularly limited, insofar as it is capable of oxidizing a catalyst, and examples thereof include air (oxygen); a peroxide, such as a hydrogen peroxide, peracetic acid, perbenzoic acid; and the like, and air, and hydrogen peroxide are preferable, and hydrogen peroxide is particularly preferable.

The amount of an oxidizing agent used is not particularly limited, and usually 1 to 100 molar equivalents with respect to a platinum group element contained in a platinum group element compound used as the hydrogenation catalyst, and preferably 3 to 80 molar equivalents. The contact temperature when the catalyst in a reduced state and the oxidizing agent are brought into contact with each other is usually 0 to 100° C., preferably 10 to 95° C., and more preferably 20 to 90° C., and the contact time is usually 10 min to 50 hours, and preferably 30 min to 40 hours.

The method of bringing a catalyst and an oxidizing agent into contact with each other is not same depending on the type of the oxidizing agent, and in a case where air is used as the oxidizing agent, examples of the method include a method where air is continuously blown into a latex in the open state; a method where the gas phase in a container in the open state or tightly closed state is filled with an air atmosphere and a latex is stirred. In a case where hydrogen peroxide is used, hydrogen peroxide may be added into a latex which is then stirred.

Insoluble Complex Removal Step

The insoluble complex removal step in the production method of the present invention is a step of continuously feeding a latex containing the insoluble complex obtained in the insoluble complex formation step to a centrifuge machine and continuously perform a centrifugation operation to continuously remove the insoluble complex from the latex. Further, the insoluble complex removal step is a step at which an insoluble complex is continuously removed, and the insoluble complex is continuously discharged out of the centrifuge machine.

In the production method of the present invention, when an insoluble complex is removed from a latex containing the insoluble complex, a centrifuge machine is used, and at the same time the latex is continuously fed to the centrifuge machine, a centrifugation operation is performed continuously, and the insoluble complex removed from the latex is continuously discharged out of the centrifuge machine. By doing so, the frequency of repair services caused by clogging or the like of the centrifuge machine can be greatly reduced, and consequently the removal of the insoluble complex can be performed continuously over an extended time period.

In particular, in the production method of the present invention, when a centrifugation operation is performed, the feed rate of the latex to the centrifuge machine is adjusted to 0.5 to 15 m$^3$/hour, and the centrifugal force in the centrifugation operation is adjusted to 200 to 10,000 G. By doing so, such removal and recovery operations can be performed continuously over an extended time period, while securing a high removal and recovery efficiency. Specifically, such removal and recovery operations can be performed continuously over an extended time period, while the recovery rate in terms of platinum group element contained in the hydrogenation catalyst used for the hydrogenation reaction is maintained preferably as high as 70% or more, more preferably as 75% or more, and further preferably as 80% or more. In addition, according to the production method of the present invention, the water content in the removed or recovered insoluble complex can be lowered preferably to 50% by weight or less, more preferably 45% by weight or less, and most preferably 40% by weight or less, so that the recovery rate of platinum group element per unit weight of the removed and recovered insoluble complex containing water can be increased, and as a result the productivity in recovery of a platinum group element can be enhanced. In this regard, if the water content in the insoluble complex is too high, the energy required to remove water in recovering the platinum group element from the insoluble complex increases, and consequently the recovery efficiency will be reduced.

The feed rate of the latex to the centrifuge machine in the insoluble complex removal step is 0.5 to 15 m$^3$/hour, preferably 0.8 to 13.0 m$^3$/hour, and more preferably 1.0 to 11.0 m$^3$/hour. When the feed rate of the latex to the centrifuge machine is too low, the productivity will be significantly reduced, on the other hand when the feed rate is too high, the centrifugation treatment becomes insufficient, and the recovery rate of the platinum group element contained in the hydrogenation catalyst decreases, and the water content in the removed and recovered insoluble complex increases.

The centrifugal force in the centrifugation operation is 200 to 10,000 G, preferably 250 to 9,000 G, and more preferably 300 to 8,000 G. When the centrifugal force in the centrifugation operation is too low, the centrifugation treatment becomes insufficient, and the recovery rate of the platinum group element contained in a hydrogenation catalyst decreases, and the water content in the removed and recovered insoluble complex increases. On the other hand, when the centrifugal force in the centrifugation operation is too high, clogging by aggregation or the like of the insoluble complex is likely to occur in the centrifuge machine, and a continuous operation over an extended time period becomes difficult, and the operability and productivity become inferior.

In the insoluble complex removal step, a centrifuge machine having a construction which is capable of feeding a latex continuously, performing a centrifugation operation continuously, and further being capable of discharging an insoluble complex removed from the latex continuously out of the centrifuge machine may be used, so that a shut-down operation of the centrifugation operation for removing an insoluble complex from the centrifuge machine may be omitted by capable of discharging the insoluble complex removed from the latex continuously out of the centrifuge machine, and therefore a continuous operation over a long period may be realized in an appropriate manner. In this regard, the construction which is capable of discharging an insoluble complex removed from the latex continuously out of the centrifuge machine according to the present invention is different from an embodiment in which a relatively large amount of the insoluble complex is discharged collectively, and means a construction which continuously discharges it at a constant rate. Specifically, considering the discharge rate per unit time (more particularly, the discharge rate per unit time, or the discharge rate per unit volume of the latex supplied to the centrifuge machine), it only requires a construction which enables an even discharge rate in a predetermined time period, but not an embodiment in which an insoluble complex is continuously discharged at a constant rate without interruption. For example, an embodiment, in which the discharge rate of an insoluble complex per unit volume of the latex supplied to the centrifuge machine, namely the amount of an insoluble complex discharged (unit: kg, in terms of the weight of a platinum group compound as a hydrogenation catalyst) per 1 m$^3$ of the latex supplied to the centrifuge machine is preferably 0.05 kg/m$^3$ or more, and more preferably 0.08 kg/m$^3$ or more, is desirable.

Figure 1:
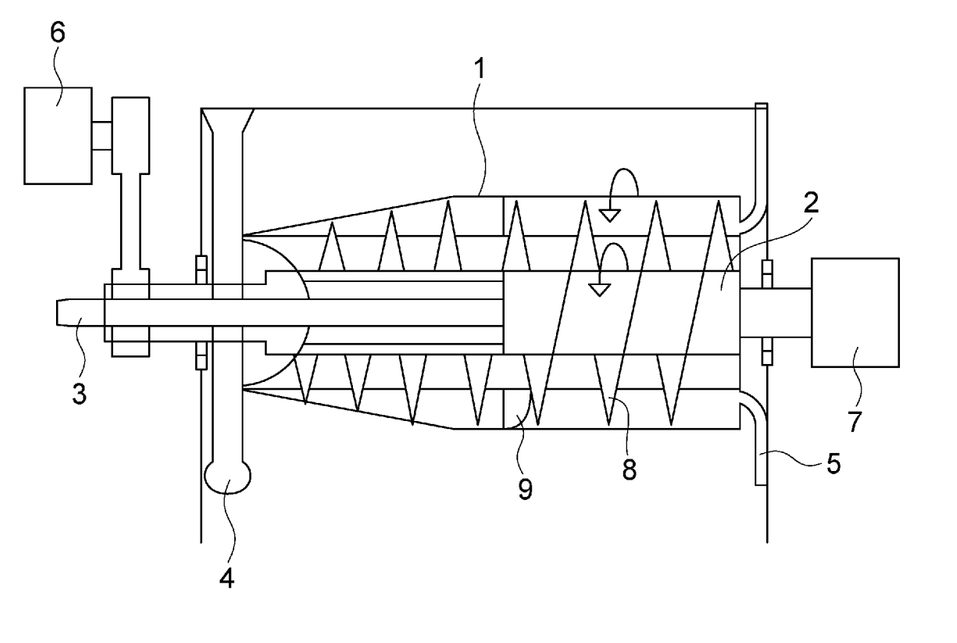
FIG. 1 is a view showing an example of a centrifugal separation apparatus used in the method of the present invention for producing a hydrogenated conjugated diene polymer latex.

The centrifuge machine used in the insoluble complex removal step may be any ones having the above construction, however from the viewpoint that removal and recovery of an insoluble complex may be carried out satisfactorily, a decanter-type centrifuge machine is preferred. FIG. 1 shows as an example of a centrifuge machine a decanter-type centrifuge machine having an outer rotating barrel, and a screw conveyor mounted in the outer rotating barrel rotatably relative thereto.

The decanter-type centrifuge machine shown in FIG. 1 is provided with an outer rotating barrel 1 rotatable in the direction of the arrow in FIG. 1, a screw conveyor 2 rotatable coaxially with the outer rotating barrel 1 and with a slight difference in a rotational speed, a feed tube 3 for feeding a latex, a solids discharge port 4, and a dam plate 5 for adjusting the liquid level. In the FIGURE, reference numeral 6 is a driving motor, and reference numeral 7 is a gear box, and the outer rotating barrel 1 and the screw conveyor 2 are rotatable in the direction of the arrow in FIG. 1 at an optional speed by the action of the driving motor 6 and the gear box 7. The screw conveyor 2 is provided with a screw blade 8 formed in a spiral shape.

A centrifugal operation using the decanter-type centrifuge machine shown in FIG. 1 will be described. Firstly, a latex containing an insoluble complex is fed continuously via the feed tube 3 provided inside the screw conveyor 2 through the supply port 9 into the outer rotating barrel 1 rotating at high speed, and a high centrifugal force is applied to the latex by the rotation of the outer rotating barrel 1 so that an insoluble complex in the latex is separated by sedimentation on the inner wall of the outer rotating barrel 1. The insoluble complex separated by sedimentation is scraped by the screw blade 8 of the screw conveyor 2 rotating coaxially with the outer rotating barrel 1 with a slight difference in a rotational speed, and transported gradually toward the solids discharge port 4, and continuously discharged from the solids discharge port 4 to the outside of the decanter-type centrifuge machine. Meanwhile, the latex, from which the insoluble complex has been removed, overflows the dam plate 5 provided on the side opposite to the solids discharge port 4 for adjusting the liquid level, and is discharged. Then, a filtration operation, and the like is performed according to need on the latex from which the insoluble complex has been removed and discharged, so that a hydrogenated conjugated diene polymer latex from which the insoluble complex has been removed may be obtained. Thus, the production method of the present invention may include a recovery step of recovering the hydrogenated conjugated diene polymer latex from which the insoluble complex has been removed.

In the decanter-type centrifuge machine shown in FIG. 1, the centrifugal force in the centrifugation operation is generated by the rotation of the outer rotating barrel 1, so that the centrifugal force can be adjusted according to the rotational speed of the outer rotating barrel 1. Therefore, when the decanter-type centrifuge machine shown in FIG. 1 is used, the centrifugal force in the centrifugation operation is adjusted within the above range by adjusting the rotational speed of the outer rotating barrel 1. In this regard, the following equation (1) holds between the rotational speed of the outer rotating barrel 1 and the centrifugal force.

$$RCF = R \times N^2 / 874 \quad (1)$$

(In the equation (1), RCF represents a centrifugal force (unit: G), R represents the radius of gyration of the outer rotating barrel 1 (unit: m), and N represents the number of revolutions per minute (unit: rpm).)

When the decanter-type centrifuge machine shown in FIG. 1 is used, the feed rate of a latex to the decanter-type centrifuge machine may be adjusted in the above range, for example, by regulating the liquid delivery pressure of the pump for sending the latex to the feed tube 3.

The difference between the rotational speed of the outer rotating barrel 1 and the rotational speed of the screw conveyor 2 may be appropriately set, but is preferably 15 revolutions per minute or less, and more preferably 12 revolutions per minute or less. By setting the difference between the rotational speed of the outer rotating barrel 1 and the rotational speed of the screw conveyor 2 within such a range, the removal and recovery efficiency with respect to an insoluble complex can be improved properly.

As described above, according to the production method of the present invention, a platinum group element contained in the hydrogenation catalyst used for a hydrogenation reaction can be removed and recovered at a high removal and recovery rate, and moreover such removal and recovery operations can be performed continuously over an extended time period. Furthermore, according to the production method of the present invention, it is also possible to reduce the water content in the removed and recovered insoluble complex. Therefore, according to the production method of the present invention, when a hydrogenated conjugated diene polymer latex is produced, the removal and recovery of the hydrogenation catalyst can be performed with high efficiency at a high productivity, which is extremely useful from the viewpoint of the quality of the obtained hydrogenated conjugated diene polymer latex, and the viewpoint of regeneration of the hydrogenation catalyst.

EXAMPLES

The present invention will be described more specifically below with reference to Examples and Comparative Example, provided that the present invention is not limited to the Examples. In the following, "part" is on a weight basis unless otherwise specified. The test or evaluation methods of physical properties and characteristics are as follows.

Example 1

Hydrogenation Step

Into an autoclave, 2 parts of potassium oleate, 180 parts of ion exchanged water, 34 parts of acrylonitrile, 4 parts of methacrylic acid, and 0.5 part of t-dodecyl mercaptan were sequentially charged. After replacing the inside of the reactor with nitrogen, 62 parts of 1,3-butadiene was injected therein. The reactor was cooled to 10° C., and 0.01 part of cumene hydroperoxide, and 0.01 part of ferrous sulfate were added. Next, the content of the reactor was stirred and mixed thoroughly for 16 hours while the reactor is kept at 10° C. Thereafter, the polymerization was terminated by adding a 10% aqueous solution of hydroquinone into the reactor. The polymerization conversion was 90%. Unreacted monomers were removed from the polymerization reaction solution to obtain an acrylonitrile/butadiene/methacrylic acid copolymer latex for being subjected to a hydrogenation reaction.

To palladium chloride (weight ratio of Pd metal in palladium chloride/acrylonitrile/butadiene/methacrylic acid copolymer in the latex is 2700 ppm by weight), an aqueous solution containing sodium chloride as much as 2 molar equivalents of the Pd metal in palladium chloride was added to obtain an aqueous solution of palladium. To 300 parts of the obtained aqueous solution of palladium, polyvinylpyrrolidone having a weight average molecular weight of 5,000 was added in an amount by weight 5 times as much as the Pd metal in palladium chloride, and further an aqueous solution of potassium hydroxide was added so as to prepare an aqueous catalyst solution with pH 12.0.

Subsequently, the total solid content concentration of the acrylonitrile/butadiene/methacrylic acid copolymer latex obtained above was adjusted to a 25% by weight, and 400 parts (100 parts in terms of solid content) of the acrylonitrile/butadiene/methacrylic acid copolymer latex whose total solid content concentration was adjusted, and 300 parts of an aqueous catalyst solution prepared above were charged into an autoclave equipped with a stirrer, and a nitrogen gas was fed for 10 min to remove the dissolved oxygen in the latex. After purging the inside of the system twice with a hydrogen gas, the pressure was raised to 3 MPa with hydrogen. The content was heated to 50° C., and allowed to react for 6 hours to yield a reaction mixture of a hydrogenated acrylonitrile/butadiene/methacrylic acid copolymer in a latex state.

Insoluble Complex Formation Step

Next, to the reaction mixture of a hydrogenated acrylonitrile/butadiene/methacrylic acid copolymer in a latex state obtained above, a basic compound was added, and a mixed aqueous solution of dimethylglyoxime corresponding to 5 molar equivalents of the Pd metal contained in palladium chloride used for the hydrogenation reaction, and potassium hydroxide corresponding to 2 molar equivalents of the dimethylglyoxime was added, and further a hydrogen peroxide solution corresponding to 30 molar equivalents of the Pd metal was added. Then the mixture was heated to 80° C. and stirred for 5 hours, after which an insoluble complex precipitated in the latex.

Insoluble Complex Removal Step

Then, from the latex containing an insoluble complex prepared above, the insoluble complex was removed by a centrifugation operation using a decanter-type centrifuge machine (product name "PTM 300 screw type decanter", manufactured by TCMOE Engineering Co., Ltd.) shown in FIG. 1. Specifically, a latex containing the insoluble complex was continuously fed via the feed tube 3 through the supply port 9 into the decanter-type centrifuge machine shown in FIG. 1, and the insoluble complex was separated by continuous centrifugation by rotating the outer rotating barrel 1 and the screw conveyor 2. The latex, from which the insoluble complex was removed, overflowed the dam plate 5, and was discharged out of the decanter-type centrifuge machine. The centrifugation operation was carried out, discharging continuously the separated insoluble complex through the solids discharge port 4 out of the decanter-type centrifuge machine. The latex from which the insoluble complex was removed, and which was discharged out of the decanter-type centrifuge machine, was next filtrated with a 300 mesh filtration apparatus to produce continuously a hydrogenated conjugated diene polymer latex.

The centrifugation operation using a decanter-type centrifuge machine was performed under the following conditions.

Feed rate of latex to decanter-type centrifuge machine: 6.0 m³/hour Centrifugal force: 1,000 G Difference in rotational speed between outer rotating barrel 1 and screw conveyor 2: 4 rpm Then, the centrifugation operation using the above-described decanter-type centrifuge machine was continuously performed using 10 m³ of the latex containing an insoluble complex. As a result, during the centrifugation operation for the 10 m³ of latex, clogging of the insoluble complex in the decanter-type centrifuge machine, or clogging of the insoluble complex in each filtration apparatus did not occur, and the centrifugation operation could be performed without a single stop of the operation. The discharge rate of the insoluble complex out of the decanter-type centrifuge machine during the centrifugation treatment in terms of discharge amount of the insoluble complex (discharge amount in terms of palladium chloride) per 1 m³ of the latex fed to the decanter-type centrifuge machine was 0.62 kg/m³. In this regard, a discharge rate of an insoluble complex can also be determined according to, for example, "amount of insoluble complex per 1 m³ of latex (kg/m³)×catalyst recovery rate (%)/100".

As a result of the centrifugation operation, the water content of the insoluble complex discharged out of the decanter-type centrifuge machine was 32.9% by weight, and the recovery rate of the palladium metal recovered as an insoluble complex (recovery rate of palladium metal (%)=amount of recovered palladium metal/amount of palladium metal in palladium chloride used for hydrogenation× 100) was 90.5%.

Example 2

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 700 ppm by weight in terms of the weight ratio of the Pd metal in palladium chloride to the acrylonitrile/butadiene/methacrylic acid copolymer in the latex.

Insoluble Complex Removal Step

By continuously performing a centrifugation operation in the same manner as in Example 1, a hydrogenated conjugated diene polymer latex was produced continuously in the same manner as in Example 1, except that with respect to the latex containing an insoluble complex prepared above, the feed rate of the latex to the decanter-type centrifuge machine was changed to 8.0 m³/hour, and the centrifugal force was changed to 2,100 G.

Also in Example 2, the centrifugation operation using the above-described decanter-type centrifuge machine was continuously performed using 10 m³ of the latex containing an insoluble complex. As a result, during the centrifugation operation for the 10 m³ of latex, clogging of the insoluble complex in the decanter-type centrifuge machine, or clogging of the insoluble complex in each filtration apparatus did not occur, and the centrifugation operation could be performed without a single stop of the operation. The discharge rate of the insoluble complex out of the decanter-type centrifuge machine during the centrifugation treatment in terms of discharge amount of the insoluble complex (discharge amount in terms of palladium chloride) per 1 m³ of the latex fed to the decanter-type centrifuge machine was 0.12 kg/m³.

As a result of the centrifugation operation, the water content of the insoluble complex discharged out of the decanter-type centrifuge machine was 36.8% by weight, and the recovery rate of the palladium metal recovered as an insoluble complex was 93.2%.

Example 3

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 1300 ppm by weight in terms of the weight ratio of the Pd metal in palladium chloride to the acrylonitrile/butadiene/methacrylic acid copolymer in the latex.

Insoluble Complex Removal Step

By continuously performing a centrifugation operation in the same manner as in Example 1, a hydrogenated conjugated diene polymer latex was produced continuously in the same manner as in Example 1, except that with respect to the latex containing an insoluble complex prepared above, the feed rate of the latex to the decanter-type centrifuge machine was changed to 10.0 m³/hour, and the centrifugal force was changed to 6,000 G.

Also in Example 3, the centrifugation operation using the above-described decanter-type centrifuge machine was continuously performed using 10 m³ of the latex containing an insoluble complex. As a result, during the centrifugation operation for the 10 m³ of latex, clogging of the insoluble complex in the decanter-type centrifuge machine, or clogging of the insoluble complex in each filtration apparatus did not occur, and the centrifugation operation could be performed without a single stop of the operation. The discharge rate of the insoluble complex out of the decanter-type centrifuge machine during the centrifugation treatment in terms of discharge amount of the insoluble complex (discharge amount in terms of palladium chloride) per 1 m³ of the latex fed to the decanter-type centrifuge machine was 0.31 kg/m³.

As a result of the centrifugation operation, the water content of the insoluble complex discharged out of the decanter-type centrifuge machine was 35.2% by weight, and the recovery rate of the palladium metal recovered as an insoluble complex was 94.1%.

Example 4

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 2400 ppm by weight in terms of the weight ratio of the Pd metal in palladium chloride to the acrylonitrile/butadiene/methacrylic acid copolymer in the latex.

Insoluble Complex Removal Step

By continuously performing a centrifugation operation in the same manner as in Example 1, a hydrogenated conjugated diene polymer latex was produced continuously in the same manner as in Example 1, except that with respect to the latex containing an insoluble complex prepared above, the feed rate of the latex to the decanter-type centrifuge machine was changed to 4.5 m³/hour, and the centrifugal force was changed to 600 G.

Also in Example 4, the centrifugation operation using the above-described decanter-type centrifuge machine was continuously performed using 10 m³ of the latex containing an insoluble complex. As a result, during the centrifugation operation for the 10 m³ of latex, clogging of the insoluble complex in the decanter-type centrifuge machine, or clogging of the insoluble complex in each filtration apparatus did not occur, and the centrifugation operation could be performed without a single stop of the operation. The discharge rate of the insoluble complex out of the decanter-type centrifuge machine during the centrifugation treatment in terms of discharge amount of the insoluble complex (discharge amount in terms of palladium chloride) per 1 m³ of the latex fed to the decanter-type centrifuge machine was 0.58 kg/m³.

As a result of the centrifugation operation, the water content of the insoluble complex discharged out of the decanter-type centrifuge machine was 31.5% by weight, and the recovery rate of the palladium metal recovered as an insoluble complex was 91.8%.

Example 5

Hydrogenation Step

Into an autoclave, 2 parts of potassium oleate, 180 parts of ion exchange water, 25 parts of acrylonitrile, 30 parts of 2-methoxyethyl acrylate, 5 parts of mono n-butyl maleate, and 0.5 part of t-dodecyl mercaptan were sequentially charged. After purging the inside of the reactor with nitrogen, 40 parts of 1,3-butadiene was injected therein. The reactor was cooled to 10° C., and 0.01 part of cumene hydroperoxide, and 0.01 part of ferrous sulfate were added. Next, the content of the reactor was stirred and mixed thoroughly for 16 hours while the reactor is kept at 10° C. Thereafter, the polymerization was terminated by adding a 10% aqueous solution of hydroquinone into the reactor. The polymerization conversion was 90%. Unreacted monomers were removed from the polymerization reaction solution to obtain an acrylonitrile/butadiene/2-methoxyethyl acrylate/mono-n-butyl maleate copolymer latex for being subjected to a hydrogenation reaction.

To palladium chloride (weight ratio of Pd metal in palladium chloride to acrylonitrile/butadiene/2-methoxyethyl acrylate/mono-n-butyl maleate copolymer in the latex was 2000 ppm by weight), an aqueous solution containing sodium chloride as much as 2 molar equivalents of the Pd metal in palladium chloride was added to obtain an aqueous solution of palladium. To 300 parts of the obtained aqueous solution of palladium, polyvinylpyrrolidone having a weight average molecular weight of 5,000 was added in an amount by weight 5 times as much as the Pd metal in palladium chloride, and further an aqueous solution of potassium hydroxide was added so as to prepare an aqueous catalyst solution with pH 12.0.

Subsequently, the total solid content concentration of the acrylonitrile/butadiene/2-methoxyethyl acrylate/mono-n-butyl maleate copolymer latex obtained above was adjusted to 25% by weight, and 400 parts (100 parts in terms of solid content) of the acrylonitrile/butadiene/2-methoxyethyl acrylate/mono-n-butyl maleate copolymer latex whose total solid content concentration was adjusted, and 300 parts of the aqueous catalyst solution prepared above were charged into an autoclave equipped with a stirrer, and a nitrogen gas was fed for 10 min to remove the dissolved oxygen in the latex. After purging the inside of the system twice with a hydrogen gas, the pressure was raised to 3 MPa with hydrogen. The content was heated to 50° C., and allowed to react for 6 hours to yield a reaction mixture of a hydrogenated acrylonitrile/butadiene/2-methoxyethyl acrylate/mono-n-butyl maleate copolymer in a latex state.

Insoluble Complex Formation Step

Subsequently, an insoluble complex was precipitated in the latex in the same manner as in Example 1 except that the reaction mixture of a hydrogenated acrylonitrile/butadiene/2-methoxyethyl acrylate/mono-n-butyl maleate copolymer in a latex state obtained above was used.

Insoluble Complex Removal Step

By continuously performing a centrifugation operation in the same manner as in Example 1, a hydrogenated conjugated diene polymer latex was produced continuously in the same manner as in Example 1, except that with respect to the latex containing an insoluble complex prepared above, the feed rate of the latex to the decanter-type centrifuge machine was changed to 6.5 m³/hour, and the centrifugal force was changed to 1,300 G.

Also in Example 5, the centrifugation operation using the above-described decanter-type centrifuge machine was continuously performed using 10 m³ of the latex containing an insoluble complex. As a result, during the centrifugation operation for the 10 m³ of latex, clogging of the insoluble complex in the decanter-type centrifuge machine, or clogging of the insoluble complex in each filtration apparatus did not occur, and the centrifugation operation could be performed without a single stop of the operation. The discharge rate of the insoluble complex out of the decanter-type centrifuge machine during the centrifugation treatment in terms of discharge amount of the insoluble complex (discharge amount in terms of palladium chloride) per 1 m³ of the latex fed to the decanter-type centrifuge machine was 0.46 kg/m³.

As a result of the centrifugation operation, the water content of the insoluble complex discharged out of the decanter-type centrifuge machine was 35.5% by weight, and the recovery rate of the palladium metal recovered as an insoluble complex was 95.1%.

Comparative Example 1

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 2600 ppm by weight in terms of the weight ratio of the Pd metal in palladium chloride to the acrylonitrile/butadiene/methacrylic acid copolymer in the latex.

Insoluble Complex Removal Step

By continuously performing a centrifugation operation in the same manner as in Example 1, a hydrogenated conjugated diene polymer latex was produced continuously in the same manner as in Example 1, except that with respect to the latex containing an insoluble complex prepared above, the feed rate of the latex to the decanter-type centrifuge machine was changed to 1.5 m$^3$/hour, and the centrifugal force was changed to 120 G.

Also in Comparative Example 1, the centrifugation operation using the above-described decanter-type centrifuge machine was continuously performed using 10 m$^3$ of the latex containing an insoluble complex. As a result, during the centrifugation operation for the 10 m$^3$ of latex, clogging of an insoluble complex in a decanter-type centrifuge machine occurred frequently, and it was necessary to stop the operation of the decanter-type centrifuge machine 3 times for conducting repair services. The discharge rate of the insoluble complex out of the decanter-type centrifuge machine during the centrifugation treatment in terms of discharge amount of the insoluble complex (discharge amount in terms of palladium chloride) per 1 m$^3$ of the latex fed to the decanter-type centrifuge machine was 0.52 kg/m$^3$.

As a result of the centrifugation operation, the water content of the insoluble complex discharged out of the decanter-type centrifuge machine was 58.2% by weight, and the recovery rate of the palladium metal recovered as an insoluble complex was 78.0%.

Comparative Example 2

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 3000 ppm by weight in terms of the weight ratio of the Pd metal in palladium chloride to the acrylonitrile/butadiene/methacrylic acid copolymer in the latex.

Insoluble Complex Removal Step

By continuously performing a centrifugation operation in the same manner as in Example 1, a hydrogenated conjugated diene polymer latex was produced continuously in the same manner as in Example 1, except that with respect to the latex containing an insoluble complex prepared above, the feed rate of the latex to the decanter-type centrifuge machine was changed to 8.0 m$^3$/hour, and the centrifugal force was changed to 12000 G.

Also in Comparative Example 2, the centrifugation operation using the above-described decanter-type centrifuge machine was continuously performed using 10 m$^3$ of the latex containing an insoluble complex. As a result, during the centrifugation operation for the 10 m$^3$ of latex, clogging of an insoluble complex in a decanter-type centrifuge machine occurred frequently, and it was necessary to stop the operation of the decanter-type centrifuge machine 12 times for conducting repair services. The discharge rate of the insoluble complex out of the decanter-type centrifuge machine during the centrifugation treatment in terms of discharge amount of the insoluble complex (discharge amount in terms of palladium chloride) per 1 m$^3$ of the latex fed to the decanter-type centrifuge machine was 0.62 kg/m$^3$.

The water content of the insoluble complex discharged out of the decanter-type centrifuge machine was 38.0% by weight, and the recovery rate of the palladium metal recovered as an insoluble complex was 83.0%.

Comparative Example 3

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 900 ppm by weight in terms of the weight ratio of the Pd metal in palladium chloride to the acrylonitrile/butadiene/methacrylic acid copolymer in the latex.

Insoluble Complex Removal Step

By continuously performing a centrifugation operation in the same manner as in Example 1, a hydrogenated conjugated diene polymer latex was produced continuously in the same manner as in Example 1, except that with respect to the latex containing an insoluble complex prepared above, the feed rate of the latex to the decanter-type centrifuge machine was changed to 18.0 m$^3$/hour, and the centrifugal force was changed to 3000 G.

Also in Comparative Example 3, the centrifugation operation using the above-described decanter-type centrifuge machine was continuously performed using 10 m$^3$ of the latex containing an insoluble complex. As a result, during the centrifugation operation for the 10 m$^3$ of latex, clogging of the insoluble complex in the decanter-type centrifuge machine, or clogging of the insoluble complex in each filtration apparatus did not occur, and the centrifugation operation could be performed without a single stop of the operation. The discharge rate of the insoluble complex out of the decanter-type centrifuge machine during the centrifugation treatment in terms of discharge amount of the insoluble complex (discharge amount in terms of palladium chloride) per 1 m$^3$ of the latex fed to the decanter-type centrifuge machine was 0.22 kg/m$^3$.

As a result of the centrifugation operation, the water content of water content of the insoluble complex discharged out of the decanter-type centrifuge machine was 55.3% by weight, and the recovery rate of the palladium metal recovered as an insoluble complex was 72.0%.

Comparative Example 4

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 1,800 ppm by weight in terms of the weight ratio of the Pd metal in palladium chloride to the acrylonitrile/butadiene/methacrylic acid copolymer in the latex.

Insoluble Complex Removal Step

A centrifugation operation was performed using a disk separator type centrifuge machine (product name "Disc Separator SJ180F", manufactured by Mitsubishi Kakoki Kaisha, Ltd.), as the centrifuge machine in place of the decanter-type centrifuge machine shown in FIG. 1. The disk separator type centrifuge machine used in Comparative Example 4 is an apparatus that continuously performs centrifugation by rotation of the disk, and it is so configured due to its mechanism, that the solid content separated by the centrifugation (namely, insoluble complex) is not continuously discharged, but retained in the apparatus. Therefore, in Comparative Example 4 the method was applied in which the latex containing the insoluble complex was continuously fed to the disk separator type centrifuge machine to continuously undergo the centrifugation operation, while the separated insoluble complex was retained in the disk separator type centrifuge machine. The feed rate of the latex to the disk separator type centrifuge machine was 9.0 m$^3$/hour, and the centrifugal force was 18,000 G.

And also in Comparative Example 4, the centrifugation operation using the above-described disk separator type centrifuge machine was continuously performed using 10 m$^3$ of the latex containing an insoluble complex. As a result, during the centrifugation operation for the 10 m$^3$ of latex, it was necessary to stop the operation of the disk separator type centrifuge machine 5 times for removing the separated insoluble complex.

The water content of the insoluble complex discharged out of the disk separator type centrifuge machine was 62.0% by weight, and the recovery rate of the palladium metal recovered as an insoluble complex was 93.0%.

Comparative Example 5

Hydrogenation Step, and Insoluble Complex Formation Step

A reaction mixture of a hydrogenated acrylonitrile/butadiene/methacrylic acid copolymer in a latex state was obtained by performing the hydrogenation reaction in the same manner as in Example 1, and an insoluble complex was precipitated in the latex in the same manner as in Example 1, except that the amount of palladium chloride used was changed to 1200 ppm by weight in terms of the weight ratio of the Pd metal in palladium chloride to the acrylonitrile/butadiene/methacrylic acid copolymer in the latex.

Insoluble Complex Removal Step

A centrifugation operation was performed using a basket type centrifuge machine (product name "ACE-300", manufactured by Tanabe Willtec Inc.), as the centrifuge machine in place of the decanter-type centrifuge machine shown in FIG. 1. The basket type centrifuge machine used in Comparative Example 5 is a batch-type centrifuge machine, and it is so configured due to its mechanism, that the solid content separated by the centrifugation (namely, insoluble complex) cannot be continuously discharged. Therefore, in Comparative Example 5, an operation in which the latex containing the insoluble complex was sequentially supplied to the basket type centrifuge machine, the centrifugation operation was performed thereon with a centrifugal force of 800 G, and after the centrifugation operation the latex and the separated insoluble complex were sequentially discharged was necessary.

In Comparative Example 5, for performing the centrifugation operation using the above-described basket type centrifuge machine with respect to 10 m$^3$ of a latex containing an insoluble complex, it was necessary to conduct the actions of feeding of the latex, centrifugation, and discharge totally 20 times.

The water content of the insoluble complex discharged out of the basket type centrifuge machine was 64.0% by weight, and the recovery rate of the palladium metal recovered as an insoluble complex was 84.4%.

TABLE 1

|  |  | Example | | | | | Comparative Example | | | | |
| --- | --- | --- | --- | --- | --- | --- | --- | --- | --- | --- | --- |
|  |  | 1 | 2 | 3 | 4 | 5 | 1 | 2 | 3 | 4 | 5 |
| Amount of palladium chloride used in hydrogenation step | (ppm by weight) | 2700 | 700 | 1300 | 2400 | 2000 | 2600 | 3000 | 900 | 1800 | 1200 |
| Type of centrifugation |  | Continuous | Continuous | Continuous | Continuous | Continuous | Continuous | Continuous | Continuous | Continuous | Batchwise |
| Feed rate of latex to centrifuge machine at time of continuous feeding | (m$^3$/hr) | 6.0 | 8.0 | 10.0 | 4.5 | 6.5 | 1.5 | 8.0 | 18.0 | 9.0 | — |
| Centrifugal force | (G) | 1000 | 2100 | 6000 | 600 | 1300 | 120 | 12000 | 3000 | 18000 | 800 |
| Discharge rate of insoluble complex(in terms of palladium chloride) | (kg/m$^3$) | 0.62 | 0.12 | 0.31 | 0.58 | 0.46 | 0.52 | 0.62 | 0.22 | Intermittent | Intermittent |
| Water content in insoluble complex | (% by weight) | 32.9 | 36.8 | 35.2 | 31.5 | 35.5 | 58.2 | 38.0 | 55.3 | 62.0 | 64.0 |
| Recovery rate of palladium metal | (%) | 90.5 | 93.2 | 94.1 | 91.8 | 95.1 | 78.0 | 83.0 | 72.0 | 93.0 | 84.4 |
| Interruption of operation |  | No | No | No | No | No | Yes | Yes | No | Yes | Yes |
| Number of interruptions of operation | (times) | 0 | 0 | 0 | 0 | 0 | 3 | 12 | 0 | 5 | 20 |

Table 1 summarizes the results of Examples 1 to 5, and Comparative Examples 1 to 5.

As shown in Table 1, in Examples 1 to 5 in which the latex containing an insoluble complex is continuously fed to the centrifuge machine at a feed rate of 0.5 to 15 m³/hour, and subjected continuously to the centrifugation operation at a centrifugal force of 200 to 10,000 G, and at the same time the separated insoluble complex was continuously discharged out of the centrifuge machine, clogging of an insoluble complex in the centrifuge machine, or clogging of an insoluble complex in each filtration apparatus did not occur, and the centrifugation operation could be performed without a single stop of the operation, to demonstrate superior operability. In addition, the recovery rate of the palladium metal was as high as 80% or more, and the water content in the separated and discharged insoluble complex could be also suppressed as low as 50% by weight or less, to demonstrate superior recovery efficiency.

On the other hand, in Comparative Example 1 in which the centrifugal force in the centrifugation operation was too low, and in Comparative Example 3 in which the feed rate of the latex containing an insoluble complex to the centrifuge machine was too fast, the recovery rate of the palladium metal was as low as less than 80%, and the water content of the separated and discharged insoluble complex was as high as more than 50% by weight. Furthermore, in Comparative Example 1, clogging of an insoluble complex in the centrifuge machine occurred frequently, and it was required to perform repair services frequently, to indicate inferior operability.

Also, in Comparative Example 2 in which the centrifugal force in the centrifugation operation was too high, clogging of an insoluble complex in the centrifuge machine occurred frequently, and it was required to perform repair services frequently, to indicate inferior operability.

Furthermore, even in a case of a continuous type centrifuge machine, as in Comparative Example 4 in which the separated insoluble complex could not be continuously discharged; or in Comparative Example 5 using the batch-type centrifuge machine, it was necessary to frequently stop the centrifugation operation, which was inferior in the operability. Further, in Comparative Examples 4 and 5, the water content of the separated and discharged insoluble complex was high, and therefore the recovery efficiency of the palladium metal was also inferior.

REFERENCE SIGNS LIST

1 Outer rotating barrel
2 Screw conveyor
3 Feed tube
4 Solids discharge port
5 Dam plate
6 Driving motor
7 Gear box
8 Screw blade
9 Supply port

The invention claimed is:

1. A method for producing a hydrogenated conjugated diene polymer latex comprising:
   a hydrogenation step of dissolving or dispersing a hydrogenation catalyst containing a platinum group element in a latex of a conjugated diene polymer to hydrogenate a carbon-carbon unsaturated bond in the conjugated diene polymer;
   an insoluble complex formation step of complexing the platinum group element with a complexing agent to form an insoluble complex; and
   an insoluble complex removing step of continuously feeding the latex which has undergone the insoluble complex formation step to a centrifuge machine and continuously performing a centrifugation operation to continuously remove the insoluble complex from the latex and continuously discharge the insoluble complex out of the centrifuge machine;
   wherein in the insoluble complex removal step the feed rate of the latex to the centrifuge machine is adjusted to 0.5 to 15 m³/hour, and the centrifugal force in the centrifugation operation is adjusted to 200 to 10,000 G.

2. The method for producing a hydrogenated conjugated diene polymer latex according to claim 1, wherein the centrifuge machine is a decanter-type centrifuge machine.

3. The method for producing a hydrogenated conjugated diene polymer latex according to claim 1, wherein in the insoluble complex formation step, an oxidation treatment is performed on the latex to oxidize the hydrogenation catalyst in a reduced state present in the latex.

4. The method for producing a hydrogenated conjugated diene polymer latex according to claim 1, wherein the complexing agent is a dioxime compound.

5. The method for producing a hydrogenated conjugated diene polymer latex according to claim 1, wherein the conjugated diene polymer is a copolymer including a conjugated diene monomer unit and an α,β-ethylenically unsaturated nitrile monomer unit.

* * * * *